United States Patent [19]

Seiceanu

[11] Patent Number: 5,246,378
[45] Date of Patent: Sep. 21, 1993

[54] COAXIAL JACK ASSEMBLY
[75] Inventor: Aurel Seiceanu, Mundelein, Ill.
[73] Assignee: Trimm, Inc., Libertyville, Ill.
[21] Appl. No.: 899,215
[22] Filed: Jun. 16, 1992

Related U.S. Application Data

[63] Continuation of Ser. No. 391,445, Aug. 9, 1989, abandoned.
[51] Int. Cl.$^5$ ............................................. H01R 29/00
[52] U.S. Cl. .................... 439/188; 200/51.03; 338/179; 439/513; 439/650
[58] Field of Search ............ 439/95, 188, 513–515, 439/912; 200/51.02–51, 05, 51.09; 338/172, 173, 178, 179, 198

[56] References Cited

U.S. PATENT DOCUMENTS

| | | | |
|---|---|---|---|
| 1,871,397 | 8/1932 | Watts | 439/281 |
| 4,236,779 | 12/1980 | Tang | 339/143 R |
| 4,290,664 | 9/1981 | Davis et al. | 339/156 R |
| 4,295,702 | 10/1981 | Snyder | 339/97 P |
| 4,367,374 | 1/1983 | Serrano | 179/2 C |
| 4,795,356 | 1/1989 | Pauza | 439/225 |
| 4,815,104 | 3/1989 | Williams et al. | 200/51.03 |
| 4,894,019 | 1/1990 | Howard | 439/188 |

Primary Examiner—Paula A. Bradley
Attorney, Agent, or Firm—Richard E. Jenkins

[57] ABSTRACT

A unitary jack assembly to facilitate monitoring, testing, maintenance, and installation of audio and visual systems as well as telecommunication systems which utilize coaxial cables for signal transmission. The jack assembly comprises a unitary housing having two coaxial jacks extending outwardly from the front thereof which are electrically connected to two corresponding coaxial connectors extending outwardly from the rear of the housing. A third coaxial jack extends outwardly from the front of the housing and is electrically connected to one of the other two coaxial jacks. A switch is carried within the jack assembly housing and is normally electrically connected to the first and second coaxial jacks and is further adapted to ground the signal in one of the jacks when the other jack has an electrical plug inserted therein.

17 Claims, 4 Drawing Sheets

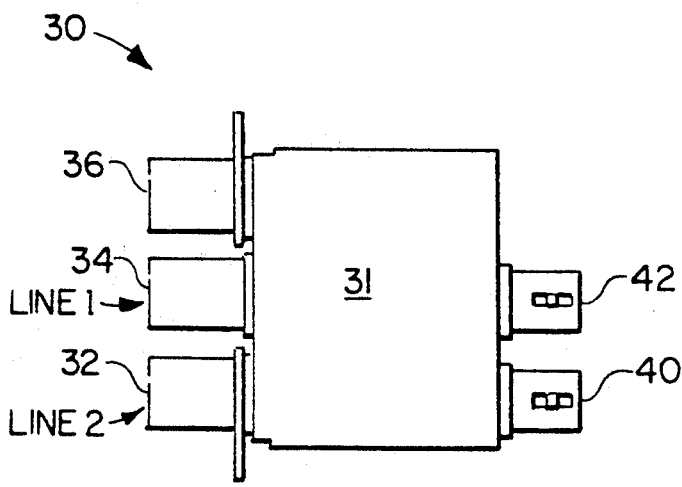
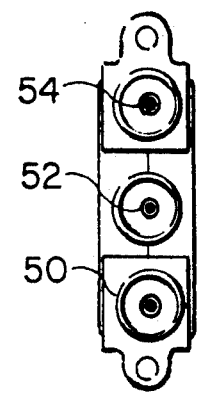
FIG. 2A  FIG. 2B
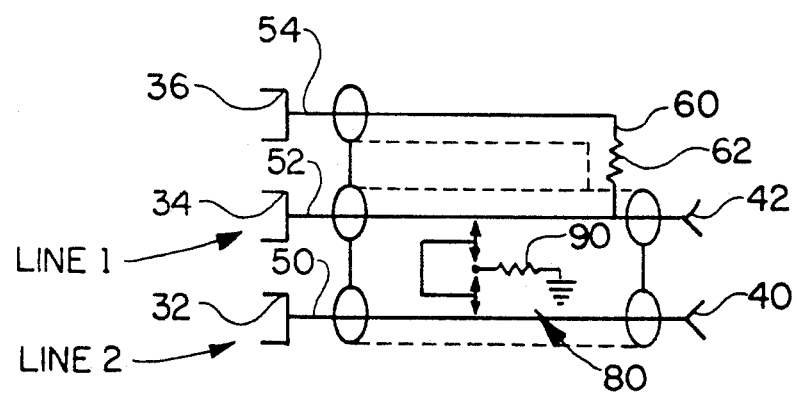
FIG. 3A
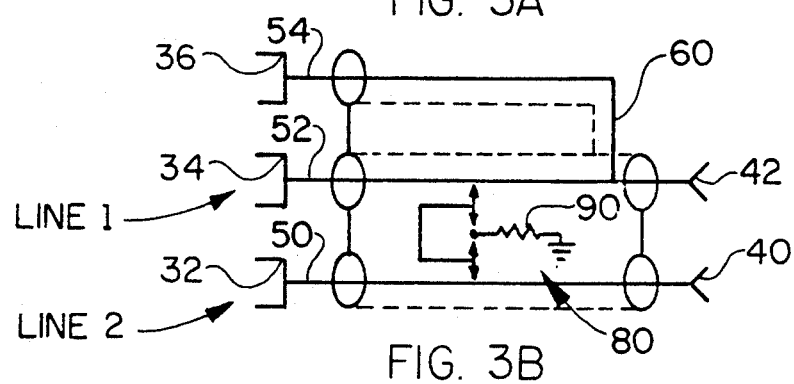
FIG. 3B

COAXIAL JACK ASSEMBLY

This is a continuation of co-pending application Ser. No. 07/391,445 filed on Aug. 9, 1989 now abandoned.

TECHNICAL FIELD

The present invention relates to coaxial cable jacks and more particularly to a coaxial cable jack assembly which provides a self-normalling double jack and monitor jack in a unitary housing.

BACKGROUND ART

Video and audio systems which utilize coaxial cables for the transmission of high frequency signals as well as digital signal telecommunications systems require some type of electrical switching device in order to facilitate installation, testing, monitoring, and maintenance of the equipment while simultaneously protecting the signal being transmitted through the coaxial cables of the system. In the prior art it is known to utilize a dual normal through jack wired to a separate single jack in order to provide the necessary functions described above. The prior art assembly typically utilized a dual normal through jack with WECO (Western Electric Company) compatible front mounted jacks and BNC rear mounted connectors and a coaxial jumper connected to a single jack with a WECO compatible front mounted jack. The rear of the single jack is typically crimp type terminated, and the single jack would provide for monitoring of one of the lines of the double jack.

The jack assembly known in the prior art suffers many shortcomings although it is widely used in telecommunications and related fields. First of all, the separate jacks connected together by the coaxial jumper provides a switching jack which is not particularly rugged or durable in use, primarily due to the external wiring between the single jack and dual normal through jack. Also, transmission characteristics such as insertion loss, return loss, crosstalk, and noise reduction are not entirely satisfactory due to the makeshift nature of the jack.

The limitations of the jack assembly known in the prior art have now been overcome by the applicant's novel jack assembly. The applicant's invention as described hereinafter is considered to be more rugged in construction as well as to provide superior performance characteristics and a greater range of applications than the prior art switch jack for reasons which will become apparent upon reading the following detailed description.

DISCLOSURE OF THE INVENTION

In accordance with the present invention, applicant provides a unitary jack assembly to facilitate monitoring, testing, maintenance, installation, and the like of electrical systems which utilize coaxial cables for signal transmission and which comprises a housing, first and second coaxial jacks mounted within the housing and extending outwardly from the front thereof for separately receiving an electrical plug therein, first and second coaxial connectors mounted within the housing and extending outwardly from the rear thereof for connecting to an incoming coaxial signal cable and an outgoing signal cable, respectively, the first and second connectors each being electrically connected to a respective one of the first and second jacks, switch means being normally electrically connected to said first and second coaxial jacks and adapted to ground the signal in one of the jacks when the other of the jacks has an electrical plug inserted therein, and a third coaxial jack mounted within the housing and extending outwardly from the front thereof for receiving an electrical plug therein, the third jack being electrically connected to one of the first and second coaxial jacks for monitoring of the signal introduced to the jack assembly by an incoming signal cable connected to one of the first and second connectors and carried from said jack assembly by an outgoing signal cable connected to the other of said first and second connectors.

It is therefore the object of this invention to provide an improved coaxial jack assembly to better facilitate monitoring, testing, maintenance, installation, and the like of electrical systems which utilize coaxial cables for signal transmission.

It is another object of the present invention to provide a novel unitary jack assembly which is more rugged and provides better performance characteristics than coaxial cable monitoring jack assemblies known heretofore.

Some of the objects of the invention having been stated, other objects will become evident as the description proceeds, when taken in connection with the accompanying drawings described below.

BRIEF DESCRIPTION OF THE DRAWINGS

FIG. 2A is a side elevation of the jack assembly of the present invention;

FIG. 2B is a front elevation view of the jack assembly of the present invention;

FIG. 3A is an electrical schematic view of one embodiment of the jack assembly of the present invention with a resistor in the monitor line;

FIG. 3B is an electrical schematic view of a second embodiment of the jack assembly of the present invention without a resistor in the monitor line;

BEST MODE FOR CARRYING OUT THE INVENTION

Figure 1A:
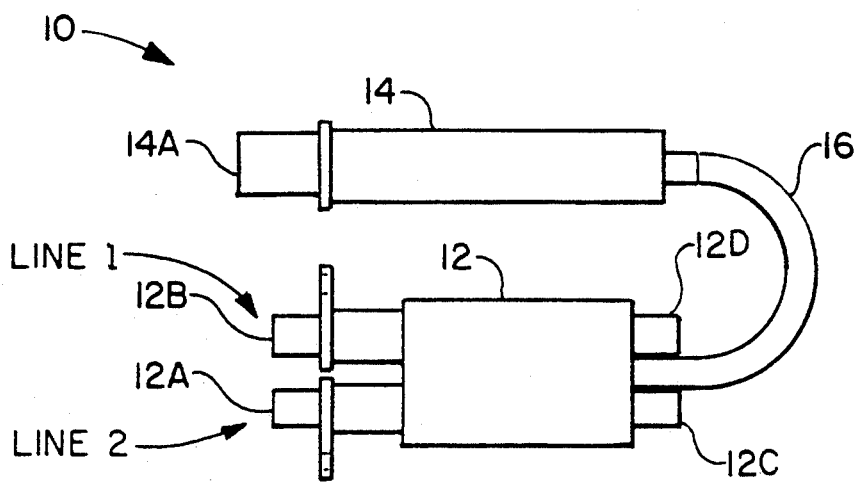
FIG. 1A is an illustration of a prior art coaxial jack assembly.

Referring now to FIGS. 1-5 of the drawings, a prior art coaxial jack assembly is illustrated in FIG. 1A and generally designated 10. Prior art jack assembly 10 comprises a dual normal through jack 12 which is connected to single jack 14 by coaxial jumper cable 16. Jacks 12 and 14 have WECO compatible jacks in the front, and jack 12 has BNC connectors at the rear thereof. Single jack 14 is crimp type terminated at the rear thereof. This type of jack assembly can be used in any number of applications wherein signals are being transmitted along coaxial cables. For instance, the jack could find application in digital signal cross-connecting equipment in a telecommunications network.

Figure 1B:
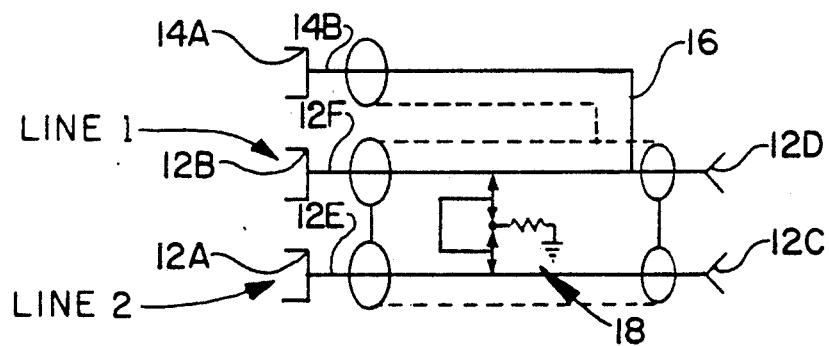
FIG. 1B is an electrical circuit schematic of the prior art coaxial jack assembly of FIG. 1A.

A conventional circuit for the prior art jack assembly of FIG. 1A is shown in FIG. 1B. The representative circuit of jack assembly 10 shown in FIG. 1B comprises WECO type jacks 12A, 12B and 14A, and BNC connectors 12C and 12D which are electrically connected to WECO jacks 12A, 12B by center contact conductor elements 12E and 12F. Center contact conductor element 14B of jack 14 is electrically connected to (Line 1 of jack 12 by the aforementioned jumper cable 16. A switch, generally designated 18 is provided for normally cross-connecting center contact conductor elements 12E and 12F of jack 12. When a plug is inserted into either jack 12A or 12B, switch 18, in response to the insertion of the jack, disconnects the switch from center contact conductor element 12E, 12F, respectively, and thereby grounds the line into which the plug was not inserted. It is believed that the construction and functioning of prior art jack assembly 10 can be fully appreciated with reference to FIGS. 1A and 1B of the drawings.

Figure 4:
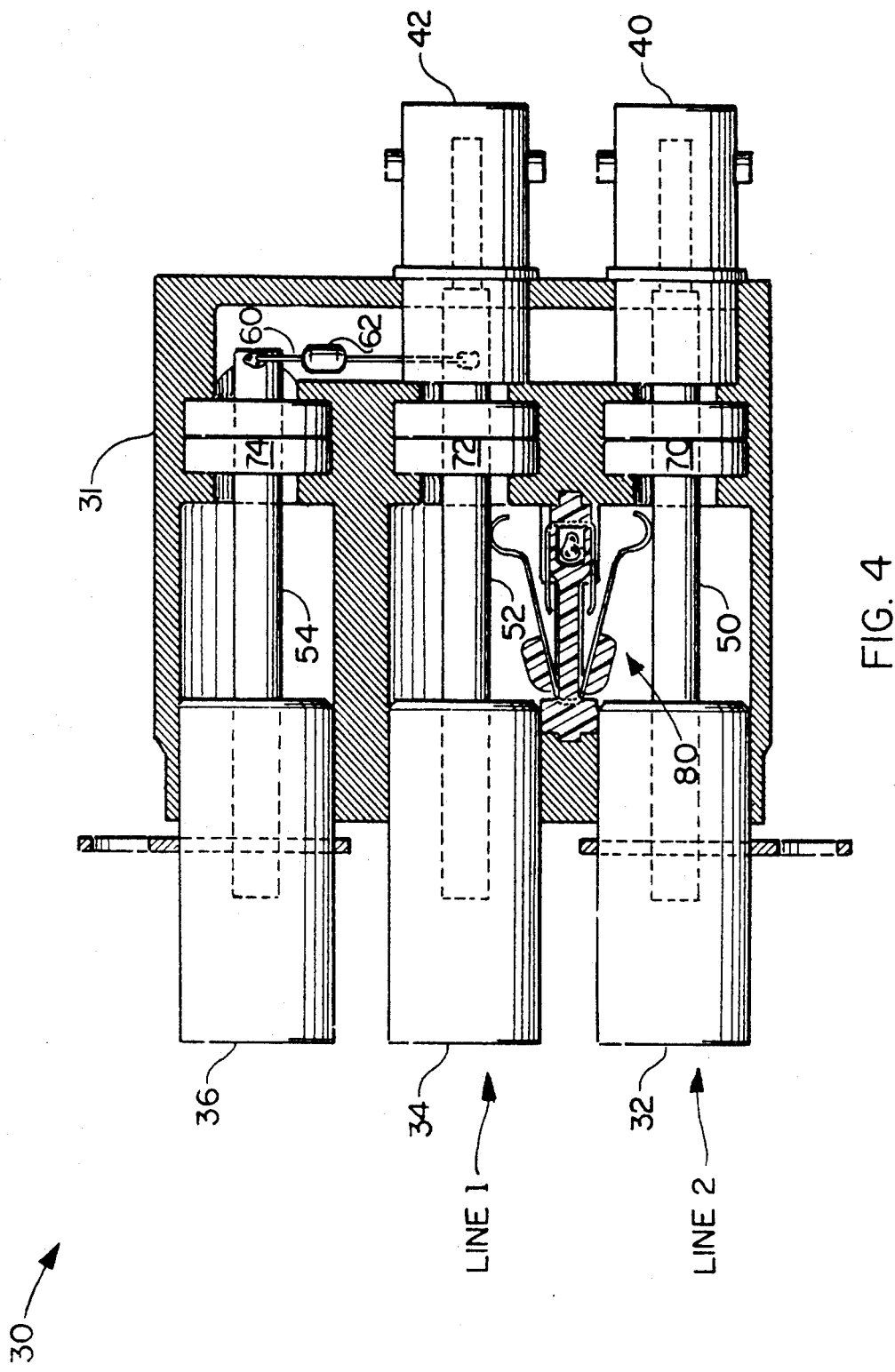
FIG. 4 is a vertical cross-sectional view of the jack assembly of the present invention.

With reference now to remaining FIGS. 2-5 of the drawings which are directed to applicant's jack, the distinctions of applicant's novel jack assembly over the prior art device can be fully appreciated. First of all, FIGS. 2A and 2B depict the jack assembly, generally designated 30, in one possible embodiment thereof wherein it is particularly adapted for vertical mounting. Jack assembly 30 comprises a metallic housing 31 which is most suitably a two-piece shell constructed of nickel plated zinc diecast alloy. Three WECO (or similar type) jacks 32, 34, 36 are mounted within housing 31 and extend forwardly from the front face thereof. Jacks 32, 34, 36 are adapted to receive an electrical plug therein. BNC (or similar type) connectors 40, 42 are also mounted in housing 31 and extend outwardly from the rear face thereof. Center contact conductor elements 50, 52 extend between and electrically connect Line 2 jack 32 and connector 40, and Line 1 jack 34 and connector 42, respectively. Center contact conductor elements 50, 52 are most suitably gold-plated phosphor bronze. A third center contact conductor element 54 is positioned in jack 36 and electrically connected to Line 1 conductor element 52 by wire connector 60 which, as a matter of design choice, may include resistor 62 as shown in FIGS. 3A and 4 in order to set the monitor line of jack assembly 30 at a specific desired value. WECO jacks 32, 34, 36 are all grounded to housing 31 as are BNC connectors 40, 42. Center contact conductor elements 50, 52, 54 are insulated from housing 31 by respective insulator discs 70, 72, 74. Insulator discs 70, 72, 74 are most suitably constructed of TEFLON and support center contact and conductor elements 50, 52, 54, respectively, in the central portions thereof.

Figure 5:
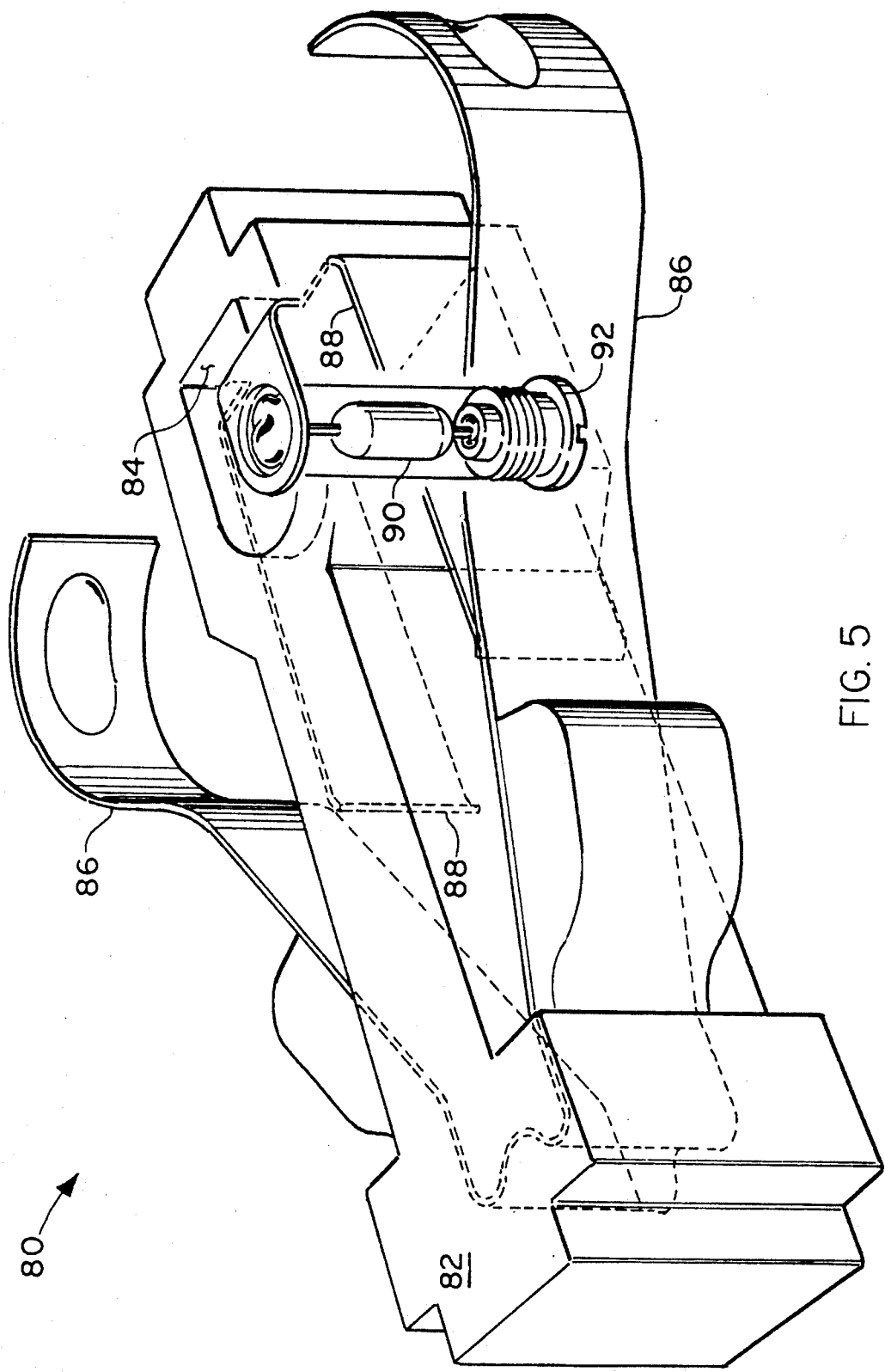
FIG. 5 is a perspective view of the switch utilized in the jack assembly of the present invention.

As best seen now with reference to FIGS. 4 and 5, WECO jacks 32, 34 are normally electrically connected by a switch assembly generally designated 80. Switch assembly 80 comprises a plastic body 82 defining an aperture 84 through one end thereof which extends transverse to the lengthwise direction of jack assembly housing 31. A V-spring 86 secured to body 82 at the end remote from aperture 84 normally engages center contact conductor elements 50, 52 of Line 2 and Line 1, respectively, of jack assembly 30. Thus, Line 1 and Line 2 of jack assembly 30 are normally in electrical connection when neither of WECO jacks 32, 34 has an electrical plug inserted therein. When a plug is inserted into either jack 32 or jack 34, V-spring 86 of switch 80 will be depressed inwardly toward switch body 82 (and out of contact with the center contact conductor element corresponding to that jack) and into electrical contact with terminating spring 88 which is mounted on switch body 82 at the same end as aperture 84. Terminating spring 88 has two arms which extend downwardly from switch body 82 toward V-spring 86 and a cap which extends across aperture 84. A resistor 90 is positioned in aperture 84 and soldered at one end thereof to the cap of terminating spring 88 and at the other end thereof to a ground screw 92 which is secured to housing 31 of jack assembly 30. The nesting of resistor 90 in aperture 84 is space-efficient and protects the resistor during both manufacture and use of jack assembly 30. Thus, when an electrical plug is inserted into, for example, jack 34 of Line 1, V-spring 86 will be disconnected from Line 1 and be brought into electrical contact with terminating spring 88. Line 2 will now ground through V-spring 86, terminating spring 88, resistor 90, and ground screw 92 into housing 31 of jack assembly 30. If a plug is inserted into Line 2, Line 1 will be grounded in the same manner into the housing of jack assembly 30. Resistor 90 is a 75 ohm resistor, although other value resistors can be used as a matter of design choice.

Thus, an improved unitary jack assembly is provided which is adapted for use in monitoring digital signals in telecommunications equipment as well as in video and audio system applications which utilize coaxial cables for the transmission of signals. The novel jack assembly provides a rugged coaxial monitoring jack which results in improved transmission characteristics during monitoring such as insertion loss, return loss, crosstalk, and noise reduction. The jack assembly is particularly well-adapted for use in digital cross-connect modules of the DSX $\frac{3}{4}$ type which are well known in the telecommunications industry.

Representative performance data and dimensions of the jack assembly illustrated in FIGS. 2A, 2B and 3A are as follows:

Performance Data

Insertion Loss: Less than 0.50 dB; DC to 250 MHz
Return Loss: Greater than 0.20 dB; DC to 250 MHz
Monitor Level: 21.0±1.5 dB; DC to 250 MHz
Crosstalk: Greater than 60 dB; DC to 250 MHz Jack Assembly Dimensions Length: $2\frac{7}{8}$ Inches
Width: 39/64 Inches
Height:
$2\frac{1}{8}$ Inches Maximum For Horizontal Mount
2 9/16 Inches Maximum For Vertical Mount
Monitor Spacing: $\frac{5}{8}$ Inches or $\frac{7}{8}$ Inches
Mating Plug:
$\frac{3}{8}$ Inch O.D. for WECO Front Jacks and BNC-Male For BNC Rear Connectors In operation, jack assembly 30 could be used, for example, in a television studio by being connected in a circuit between a television camera and a videotape recorder (not shown). To do so, the coaxial cable (not shown) from the camera would be connected to BNC connector 42 and the coaxial cable (not shown) from the videotape recorder would be connected to BNC connector 40. With jack assembly 30 thus inserted into the transmission cable, a testing instrument could be plugged into monitoring WECO jack 36 in order to measure certain desired characteristics of the camera signal. Alternatively, an electrical plug could be inserted into Line 1 WECO jack 34 (which would ground Line 2) in order to determine if the television camera is working properly. Alternatively, an electrical plug could be inserted into Line 2 WECO jack 32 (which would ground Line 1) in order to determine if the videotape recorder is working properly. Many other applications exist for the jack assembly in digital telecommunications systems as well as in video and audio systems.

It will be understood that various details of the invention may be changed without departing from the scope of the invention. Furthermore, the foregoing description is for the purpose of illustration only, and not for the purpose of limitation—the invention being defined by the claims.

What is claimed is:

1. A unitary module to facilitate monitoring, testing, maintenance, installation and the like of electrical systems which utilize coaxial cables for signal transmission, said unitary module comprising:
   a singular housing having a non-hollow interior defining a plurality of componentry receiving cavities therein;
   no more than three coaxial jacks, said jacks comprising first and second coaxial jacks each having a center contact conductor element and each of said jacks being snugly mounted and self-aligned within said housing and extending outwardly from the front thereof for separately receiving an electrical plug therein;
   no more than two coaxial connectors, said connectors comprising first and second axial connectors snugly mounted and self-aligned within said housing and extending outwardly from the rear thereof for connecting to an incoming signal cable and an outgoing signal cable, respectively, said first and second connectors each being coaxially aligned with and including therein the center contact conductor element of a respective one of said first and second jacks;
   a third coaxial jack having a center contact conductor element and snugly mounted and self-aligned within said housing and extending outwardly from the front thereof for receiving an electrical plug therein, said third jack being electrically connected to one of said first and second coaxial jacks, whereby said module will monitor a signal introduced to said module by an incoming signal cable, when said incoming signal cable is connected to one of said first and second connectors, and carried from said module by an outgoing signal cable, when said outgoing signal cable is connected to the other of said first and second connectors; and
   switch means mounted within said housing and being normally electrically connected to said first and second coaxial jacks and adapted to ground the signal in one of said jacks when the other of said jacks has an electrical plug inserted therein.

2. A unitary module according to claim 1 wherein said housing is metallic.

3. A unitary module according to claim 2 wherein said coaxial jacks and said coaxial connectors are grounded to said housing.

4. A unitary module according to claim 1 wherein said coaxial jacks are WECO type jacks.

5. A unitary module according to claim 1 wherein said coaxial connectors are BNC type connectors.

6. A unitary module according to claim 1 wherein the electrical connection between said third coaxial jack and said one of said first and second coaxial jacks includes a resistor.

7. A unitary module according to claim 6 wherein said resistor is a 75 ohm resistor.

8. A unitary module according to claim 1 wherein said switch means comprises a non-conductive switch body, a V-shaped conductive spring resiliently mounted to said switch body; a conductive element mounted to said switch body and adapted to be contacted by said V-shaped spring when an electrical plug is inserted into either said first or second coaxial cable jack, and a resistor positioned in an aperture defined within said switch body and electrically connected at one end to said conductive element and at the other end thereof being grounded to said housing.

9. A unitary module according to claim 8 wherein said resistor is a 75 ohm resistor.

10. A unitary module according to claim 8 wherein said resistor is soldered to said conductive element at one end and soldered to a ground screw in said housing at the other end thereof.

11. A unitary module to facilitate monitoring, testing, maintenance, installation and the like of electrical systems which utilize coaxial cables for signal transmission, said unitary module comprising:
    a singular metallic housing having a non-hollow interior defining a plurality of componentry receiving cavities therein;
    no more than three coaxial jacks, said jacks comprising first and second coaxial jacks each having a center contact conductor element and each of said jacks being snugly mounted and self-aligned within said housing and grounded thereto, said coaxial jacks extending outwardly from the front thereof for separately receiving an electrical plug therein;
    no more than two coaxial connectors, said connectors comprising first and second coaxial connectors snugly mounted and self-aligned within said housing and grounded thereto, said cable connectors extending outwardly from the rear of said housing for connecting to an incoming signal cable and an outgoing signal cable, respectively, said first and second connectors each being coaxially aligned with and including therein the center contact conductor element of a respective one of said first and second jacks;
    switch means being mounted within said housing and normally electrically connected to said first and second coaxial jacks and adapted to ground the signal in one of said jacks when the other of said jacks has an electrical plug inserted therein, said switch means comprising a non-conductive switch body, a V-shaped conductive spring resiliently mounted to said switch body; a conductive element mounted to said switch body and adapted to be contacted by said V-shaped spring when an electrical plug is inserted into either said first or second coaxial cable jack, and a resistor positioned in an aperture defined within said switch body and electrically connected at one end to said conductive element and at the other end thereof being grounded to said housing; and
    a third coaxial jack having a center contact conductor element and snugly mounted and self-aligned within said housing and extending outwardly from the front thereof for receiving an electrical plug therein, said third jack being electrically connected to one of said first and second coaxial jacks, whereby said module will monitor a signal introduced to said module by an incoming signal cable, when said incoming cable is connected to one of said first and second connectors, and carried from said module by an outgoing signal cable, when said outgoing signal cable is connected to the other said first and second connectors.

12. A unitary module according to claim 11 wherein said jacks are WECO type jacks.

13. A unitary module according to claim 11 wherein said coaxial connectors are BNC type connectors.

14. A unitary module according to claim 11 wherein said resistor in said switch means is a 75 ohm resistor.

15. A unitary module according to claim 11 wherein said resistor in said switch means is soldered to said conductive element at one end and soldered to a ground screw in said housing at the other end thereof.

16. A unitary module according to claim 11 wherein the electrical connection between said third coaxial jack and said one of said first and second coaxial jacks includes a resistor.

17. A unitary module according to claim 16 wherein said resistor is a 75 ohm resistor.

* * * * *